Figure 1:
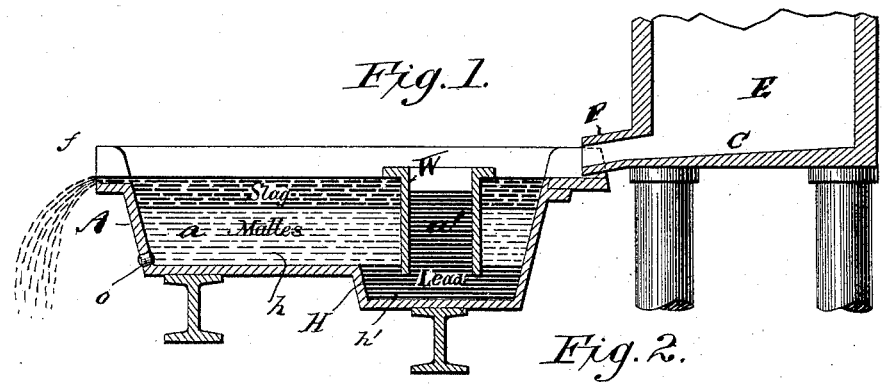

(No Model.)

W. B. DEVEREUX.
APPARATUS FOR SEPARATING LEAD AND BASE BULLION FROM SLAG.

No. 417,315. Patented Dec. 17, 1889.

Witnesses:
Sam'l S. Watters
Henry H. Graff

Inventor:
Walter B. Devereux
by his Attorney.
Willard Parker Butler

UNITED STATES PATENT OFFICE.

WALTER B. DEVEREUX, OF GLENWOOD SPRINGS, COLORADO.

APPARATUS FOR SEPARATING LEAD AND BASE BULLION FROM SLAG.

SPECIFICATION forming part of Letters Patent No. 417,315, dated December 17, 1889.

Application filed August 5, 1889. Serial No. 319,791. (No model.)

*To all whom it may concern:*

Be it known that I, WALTER B. DEVEREUX, a citizen of the United States, and a resident of Glenwood Springs, in the county of Garfield and State of Colorado, have invented a certain new and useful Improvement in Apparatus for Separating Lead and Base Bullion from Slags, Mattes, and Speiss, of which the following is a specification.

My invention relates to an apparatus for separating lead and the alloys of silver, gold, and other metals with lead, commonly known as "base bullion," from the slags and mattes which are formed in the smelting of the ores of such metals, and the object of the same is to effect the said separation outside of the furnace while it is still running, in a more convenient manner than has heretofore been possible.

It has heretofore been the practice in smelting silver ores and bullion to make use of a furnace provided with an interior hearth or crucible into which the bullion mattes and slags settle after reduction, and to use in connection therewith some one of the many forms of devices which are in common use for separating out and removing the base bullion or lead while the same is still liquid and for tapping off the mattes and slags from the furnace, either together or separately. The most usual manner of tapping off bullion is to connect the furnace-crucible with an exterior basin in which the molten base bullion or lead rises, owing to the static pressure of the column of liquid material in the furnace-hearth, and from which the bullion is removed by means of a ladle as it accumulates. The automatic or so-called "siphon-tap," which is largely in use throughout the western portion of the United States for this purpose, is too widely known and used to require description in this connection.

All the various forms of apparatus heretofore made use of for tapping off the bullion from furnaces are open in practice to very many and serious objections. The principal objection is that in cases where the ores to be smelted contain copper, zinc, baryta, or other impurities accretions are liable to be formed in the crucible, the formation of which is extremely difficult to prevent, and the growth of which causes an eventual stoppage of the furnace before it would otherwise be necessary, owing to the stoppage and chilling of the lead-well and the difficulty of keeping the passage open through the walls of the hearth. These accretions, which are hard tough masses, have to be removed by chiseling, necessitating the furnace being put out of blast and cooled off. Now I have discovered that by tapping at intervals or continuously the fluid contents of the furnace, after smelting into an external receptacle provided with certain agencies in its interior for separating the lead or so-called "base bullion" from the slags and mattes and the former from the latter by means of their specific gravity, I am able to effect a much more convenient and economical separation of the lead and base bullion as well as the mattes from the slags than has been possible heretofore, and to prevent, also, the formation of accretions, and at the same time to effect great economy in furnace-construction, for the reason that a furnace can be used in which nearly the entire crucible is eliminated, and by reason of the separation of the various portions of the smelted mass in a vessel outside of the furnace-hearth greater regularity is brought about, thus producing campaigns of much greater length.

Figure 2:
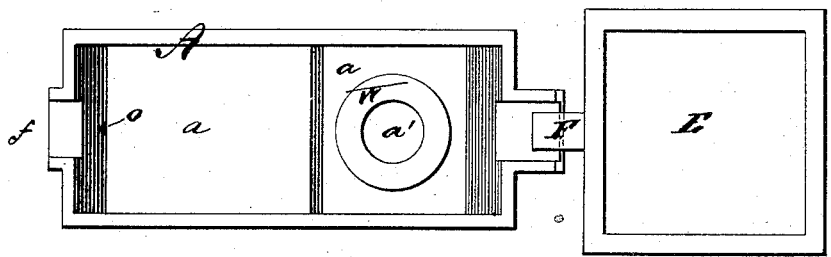
Figure 3:
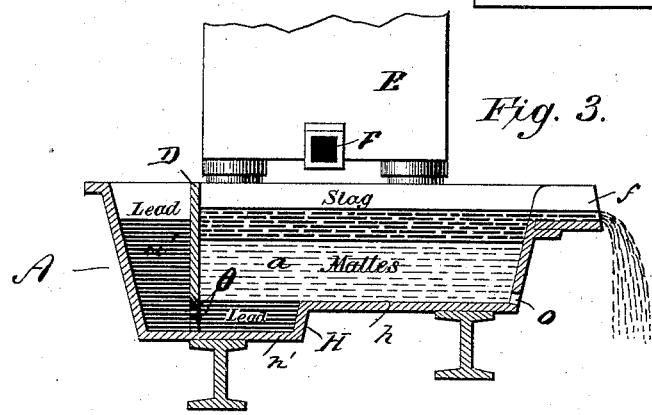
Figure 4:
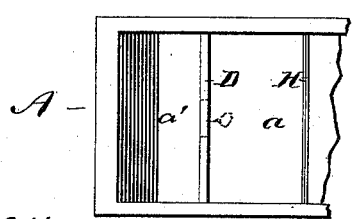

The invention will be best understood by reference to the accompanying sheet of drawings, in which Figures 1 and 2 show a sectional elevation and plan of the apparatus in which the separation of the lead is effected by a lead-well; Figs. 3 and 4, a sectional elevation and plan of the same apparatus, in which a diaphragm with an opening in its base is used instead of the lead-well.

Similar letters refer to similar parts throughout the various views.

As above stated, the method of operation of the invention consists to a certain degree, although not necessarily, in continuously tapping the smelted mass from the furnace into an exterior separating-vessel. To effect such continuous tapping, the furnace-hearth will naturally be eliminated and the furnace bottom placed close up to the fusion-zone. In cases of furnaces already built it is possible to use the invention successfully by filling the bottom with refractory material up to the tap-hole.

In the various views, E is an ordinary shaft-furnace, in which the crucible is dispensed with and the bottom C made to incline slightly downward from the back toward the breast. The furnace is provided with the ordinary form of furnace tap-hole and spout F, through which the entire smelted portion of the charge is drawn off.

The vessel A, which in my invention is substituted for the furnace-crucible, may be of any convenient dimensions or material; but in practice it will be found convenient to make it of cast-iron, rectangular in shape, with the sides flaring from bottom to top and the corners rounded off to facilitate dumping. The separation of the lead and base bullion from the other materials tapped into the vessel is effected by means of a lead-well W, as shown in Figs. 1 and 2, or a diaphragm D, with an opening O in the bottom, as shown in Figs. 3 and 4, which may be made movable or permanent, as may be found desirable. If the lead-well is used, it will in practice be made in the form of a cylinder, open at the top and bottom. Any method of supporting the lead-well in the receiver may be employed. No particular method of supporting is shown in the drawings, for the reason that in practice the simplest way of supporting the lead-well is to hold it in proper position when the melted mass is first tapped into the receiver, and as soon as the upper crust of slag begins to cool around it and the lead to rise within it it will be found to assume a vertical and practically fixed position in the receiver. The cross-section of the lead-well need not necessarily be cylindrical. It may be rectangular, elliptical, or even octagonal, but in practice the cylindrical form will be found to be preferable. In this way the receiver is divided into two compartments $a$ and $a'$, the latter within the former.

In place of the lead-well a partition-wall or diaphragm D may be used in the receiver, attached in any desired manner, provided with an opening O at its bottom, as shown in Figs. 3 and 4, thus dividing the receiver, as before, into two compartments $a$ and $a'$, connected at the bottom. Any other devices may be used that will divide the receiver into two compartments of any desired dimensions, one of which can serve as a compartment for the collection of the lead.

For the purpose of permitting the tapping off of the mattes as they accumulate in the principal compartment $a$, and for preventing any mattes or slag from flowing under the partition, or, as it is technically termed, for keeping the lead-well "sealed" during the tapping, the device is employed which is shown in the views. The receiver is so constructed that the bottom shall be of two different levels $h$ and $h'$, the connections between these levels being made by the vertical or inclined surface or step H. The lead accumulates in the lower level $h'$ of the receiver and is kept from flowing over the top of the step H by removal, from time to time, from the compartment $a'$, and the mattes settle to the upper level $h$ of the bottom, above the lead. The entrance to the compartment $a'$, being at a lower level than the step H, is thereby kept sealed during the process of tapping, even though the entire mass is tapped off.

An opening $o$ is provided in the extreme base of the end wall of the receiver, opposite to the step H, which opening permits of the discharge of all of the contents of the pots, except such portion as is held back by the step, which serves as a dam and keeps back all the lead and bullion, except the small portion which has settled at the left-hand side of the dam in Figs. 1 and 2, and the right-hand side in Fig. 3, which will run out with the matte and form a button easily separated in the vessel into which the tapping takes place. This opening may be closed in any convenient manner; but in practice a stopping of fire-clay may be used, or a cast-iron plug, or, in fact, any other substance that will not cause the generation of gases in the interior of the receiver by reason of its proximity to the smelted mass. The opening $o$ is placed in the bottom of the end walls at the point where it joins the upper level of the bottom, and the step H serves as a dam and holds back the lead and prevents it from flowing out with the matte, when the latter is tapped, through the opening $o$. This opening is closed in the same manner as before.

In each form of apparatus a slag-spout $f$ is provided at the upper edge of the pot, through which the slag, being the lightest portion of the material tapped from the furnace, flows off continuously into any desired receptacle.

The method of separation effected by such an apparatus is as follows: In the smelting of lead ores, as is well known, the various products and by-products of the furnace differ in specific gravity. The lead and base bullion as they issue from the furnace are slightly heavier than the mattes, speiss, and slags which flow out with them, and will consequently settle to the bottom of any vessel in which all of the furnace products are collected while molten, allowing the mattes, speiss, and slags to float on the top of the lead. Where the entire contents of the furnace-crucible is tapped into one compartment of a vessel divided into two compartments which are connected at the bottom, the lead, as it settles to the bottom of the compartment into which the mass is tapped, will flow through the opening between the compartments into the other compartments, and will rise in that compartment in proportion as the static pressure of the liquid in the first compartment increases. The slag, mattes, and speiss, although lighter than the lead and being also liquid, will keep the static pressure of the column of liquid in the two compartments practically constant, while the slag, being lighter than the mattes and speiss, will form the top of the mass, and the top layer of the same will cool rapidly and form a crust which answers all the purposes of a cover to the receiver. The effect of the insertion of a lead-well, or a diaphragm with an opening in its bottom, into the receiver described, is to divide the latter into two compartments, which are connected with each other through the open bottom of the lead-well or the opening in the diaphragm. When the melted material from the furnace, consisting of slag, mattes, speiss, and bullion, or either of them, is allowed to run, they immediately assume positions in the receiver in accordance with their relative specific gravity, the lead or bullion forming the lowest layer. As the lead or bullion accumulates in the receiver it rises in the lead-well, or in the compartment $a'$ back of the diaphragm, to a certain height, which is dependent upon the static pressure of the material in the principal compartment $a$ of the receiver. The lead may be dipped from compartment $a'$ with a ladle from time to time as fast as it accumulates, it being necessary to leave only the layer of lead or bullion in the principal compartment $a$ of sufficient depth to seal the entrance into the lead-well of the compartment $a'$, as otherwise the mattes or speiss which float directly on top of the lead or bullion in the compartment $a$ would enter the compartment $a'$, thereby causing great trouble and inconvenience. When a sufficient amount of mattes or speiss has accumulated in the compartment $a$, the tap-hole in the bottom or end wall of the receiver is opened and the mattes and speiss above the web H have run off, and slag commences to flow, whereupon the orifice is immediately closed and the contents of the furnace allowed to collect in the receiver, as before, until such time as the operation is repeated. By this means the matte is obtained in a comparatively pure condition and suitable for subsequent treatment. If, by any means, or if owing to any neglect, lead or bullion is drawn out of this tap-hole, or slag is allowed to run out with the matte, the former, after cooling, can easily be separated from the bottom of the matte, and the latter can be broken off from the top of the matte. The slag which occupies the upper portion of the receiver runs over through the spout provided for the purpose into the slag-buggy and is carried away. The object of this invention is to carry out a threefold separation in the compartment $a$, by means of which lead and bullion, matte and speiss, and slag are obtained in a comparatively pure state.

I claim as my invention—

1. The combination, substantially as hereinbefore set forth, with an exterior receiving or collecting vessel, into which the contents of the smelting-furnace is tapped, having a bottom made in two different levels, so that one is deeper than the other and connected by a step, of a diaphragm having an opening at its base placed in the deeper portion of the vessel, whereby the same is divided into two connected compartments, and an opening in the bottom of the shallower part of the vessel, whereby the mattes and speiss may be drawn off as they accumulate.

2. The combination, substantially as hereinbefore set forth, with an exterior receiving or collecting vessel, into which the contents of the smelting-furnace is tapped, having a bottom made in two different levels, connected by a step, so that one part is deeper than the other, of a diaphragm having an opening at its base placed in the deeper portion of the vessel, whereby the same is divided into two connected compartments, an opening in the bottom of the shallower part of the vessel, whereby the mattes and speiss may be drawn off as they accumulate, and means for closing said opening, substantially as described.

3. The combination, substantially as hereinbefore set forth, with an exterior receiving or collecting vessel, into which the contents of the smelting-furnace is tapped, having a bottom made in two different levels, connected by a step, so that one part is deeper than the other, of a diaphragm having an opening at its base placed in the deeper portion of the vessel, whereby the same is divided into two connected compartments, an opening in the bottom of the shallower part of the vessel, whereby the mattes and speiss may be drawn off as they accumulate, and an overflow-spout for the overflow of the slag at the upper edge of said collecting-vessel.

4. The combination, substantially as hereinbefore set forth, with an exterior receiving or collecting vessel, into which the contents of the smelting-furnace is tapped, having a bottom made in two different levels, connected by a step, so that one part is deeper than the other, of a lead-well having an opening at its base placed in the deeper portion of the receiving or collecting vessel, whereby the same is divided into two connected compartments, and an opening in the bottom of the shallower part of the vessel, whereby the mattes and speiss may be drawn off as they accumulate.

5. The combination, substantially as hereinbefore set forth, with an exterior receiving or collecting vessel, into which the contents of the smelting-furnace is tapped, having a bottom made in two different levels, connected by a step, so that one part is deeper than the other, of a lead-well having an opening at its base placed in the deeper portion of the receiving or collecting vessel, an opening in the bottom of the shallower part of the vessel, whereby the mattes and speiss may be drawn off as they accumulate, and means for closing said opening, substantially as described.

In testimony that I claim the foregoing as my invention I have signed my name in presence of two witnesses.

WALTER B. DEVEREUX.

Witnesses:
WILLARD PARKER BUTLER,
HENRY H. GRAFF.